US012770389B2

(12) United States Patent
Rychazhnikov et al.

(10) Patent No.: US 12,770,389 B2
(45) Date of Patent: Oct. 20, 2026

(54) FPGA-BASED SYSTEM AND METHOD FOR DYNAMICALLY SWAPPING CNNs TO IMPROVE DETECTION AND CLASSIFICATION

(71) Applicant: Aliensense Limited, Abu Dhabi (AE)

(72) Inventors: Andrei Rychazhnikov, Abu Dhabi (AE); Alex Lapir, Dubai (AE)

(73) Assignee: Aliensense Limited, Abu Dhabi (AE)

( * ) Notice: Subject to any disclaimer, the term of this patent is extended or adjusted under 35 U.S.C. 154(b) by 155 days.

(21) Appl. No.: 18/828,761

(22) Filed: Sep. 9, 2024

(65) Prior Publication Data

US 2026/0073677 A1 Mar. 12, 2026

(51) Int. Cl.

| | |
|---|---|
| ***G06V 10/70*** | (2022.01) |
| ***G06V 10/764*** | (2022.01) |
| ***G06V 10/82*** | (2022.01) |
| ***G06V 10/94*** | (2022.01) |

(52) U.S. Cl.

CPC ............ *G06V 10/87* (2022.01); *G06V 10/764* (2022.01); *G06V 10/82* (2022.01); *G06V 10/955* (2022.01)

(58) Field of Classification Search

CPC ...... G06V 10/87; G06V 10/764; G06V 10/82; G06V 10/955

See application file for complete search history.

(56) References Cited

U.S. PATENT DOCUMENTS

| | | | |
|---|---|---|---|
| 10,936,907 B2 | 3/2021 | Suresh et al. | |
| 10,937,186 B2 | 3/2021 | Wang | |
| 11,698,272 B2 | 7/2023 | Kroepfl et al. | |
| 11,835,357 B2 | 12/2023 | Zhang et al. | |
| 12,230,026 B2 | 2/2025 | Behzadan | |
| 2017/0124415 A1* | 5/2017 | Choi | G06F 18/2431 |
| 2019/0130188 A1 | 5/2019 | Zhou et al. | |
| 2019/0236414 A1 | 8/2019 | Totolos, Jr. et al. | |
| 2020/0050202 A1 | 2/2020 | Suresh et al. | |
| 2021/0158009 A1 | 5/2021 | Zhou | |
| 2022/0027642 A1 | 1/2022 | Shambik et al. | |
| 2022/0301274 A1* | 9/2022 | Dimond, Jr. | G06N 3/0464 |
| 2022/0327714 A1 | 10/2022 | Cook et al. | |
| 2022/0390237 A1 | 12/2022 | Elgersma et al. | |
| 2023/0029573 A1 | 2/2023 | Behzadan | |

(Continued)

FOREIGN PATENT DOCUMENTS

| | | |
|---|---|---|
| CN | 105938559 A | 9/2016 |
| CN | 106529517 A | 3/2017 |
| CN | 109871939 B | 6/2021 |

(Continued)

OTHER PUBLICATIONS

Elghazaly, G. et al., "High-definition maps: Comprehensive survey, challenges, and future perspectives", IEEE Open Journal of Intelligent Transportation Systems 2023, vol. 4, pp. 527-550.

(Continued)

*Primary Examiner* — Abhishek Sarma

(74) *Attorney, Agent, or Firm* — Jayne Saydah

(57) ABSTRACT

Systems and methods for image recognition using FPGA computer vision devices with a field-programming gate array (FPGA) and multiple convolutional neural networks (CNNs). A first CNN is used for initial object class detection. A second CNN is swapped for the first CNN for more detailed object classification and identification.

20 Claims, 3 Drawing Sheets

(56) References Cited

U.S. PATENT DOCUMENTS

| | | | |
|---|---|---|---|
| 2023/0298331 | A1 | 9/2023 | Gonzalez-Rivero et al. |
| 2023/0298341 | A1 | 9/2023 | Gonzalez-Rivero et al. |

FOREIGN PATENT DOCUMENTS

| | | | |
|---|---|---|---|
| CN | 113255896 | A | 8/2021 |
| CN | 113792621 | A | 12/2021 |
| CN | 116109949 | A | 5/2023 |
| CN | 117218201 | A | 12/2023 |
| WO | 2023126914 | A2 | 7/2023 |
| WO | 2024042508 | A1 | 2/2024 |

OTHER PUBLICATIONS

Guan Jian et al: "A Survey of 6DoF Object Pose Estimation Methods for Different Application Scenarios", Sensors, vol. 24, No. 4, Feb. 7, 2024 (Feb. 7, 2024), p. 1076.

Mirzaeian Ali et al: "Conditional Classification: A Solution for Computational Energy Reduction", 2021 22nd International Symposium on Quality Electronic Design (ISQED), IEEE, Apr. 7, 2021 (Apr. 7, 2021), pp. 325-330.

PCT App. No. PCT/IB2025/000451; International Search Report and Written Opinion mailed Dec. 18, 2025 (pp. 1-11).

PCT App. No. PCT/IB2025/000455; International Search Report and Written Opinion mailed Dec. 8, 2025 (pp. 1-10).

Yan Zhicheng et al: "HD-CNN: Hierarchical 1-20 Deep Convolutional Neural Networks for Large Scale Visual Recognition", 2015 IEEE International Conference on Computer Vision (ICCV), IEEE, Dec. 7, 2015 (Dec. 7, 2015), pp. 2740-2748.

Zhang, G. et al., "Online map vectorization for autonomous driving: A rasterization perspective", Advances in Neural Information Processing Systems 2023, vol. 36, pp. 31865-31877.

Zou Zhengxia et al: "Object Detection in 20 Years: A Survey", Proceedings of the IEEE, IEEE. New York, US, vol. 111, No. 3, Jan. 27, 2023 (Jan. 27, 2023), pp. 257-276.

U.S. Appl. No. 18/815,106; Notice of Allowance mailed Jan. 16, 2026.

PCT App. No. PCT/IB2025/000461; International Search Report and Written Opinion mailed Jan. 21, 2026 (pp. 1-9).

Non-final Office Action dated May 29, 2026 issued in U.S. Appl. No. 18/828,754.

Notice of Allowance date Apr. 14, 2026 issued in U.S. Appl. No. 18/815,106.

* cited by examiner

FPGA-BASED SYSTEM AND METHOD FOR DYNAMICALLY SWAPPING CNNs TO IMPROVE DETECTION AND CLASSIFICATION

TECHNICAL FIELD

This invention relates to the field of image processing and machine vision, and more particularly, integrating field-programmable gate array (FPGA) technology with modular convolutional neural networks (CNNs).

BACKGROUND

Detection and classification capabilities of existing machine vision sensors suffer certain limitations. Traditional sensors lack flexibility and adaptability, as they often rely on a single, static CNN model. This results in suboptimal performance when dealing with diverse environments and changing conditions. Traditional systems also face challenges in maintaining accuracy and efficiency without incurring significant power and resource overheads, particularly in resource-constrained environments. Examples of such environments of machine vision sensors include autonomous vehicles and unmanned aerial vehicles (UAVs).

SUMMARY

A device is disclosed for capturing and classifying a digital image of an object. The device includes a flash memory and an image sensor configured for capturing a plurality of image frames of the object. The device also includes an image processing module configured to receive the plurality of image frames from the image sensor and to filter, enhance, or scale the plurality image frames. A first convolutional neural network (CNN) configured for processing the image frames and identifying a first object class. For example, the object can be in one of tens of predefined classes. A second CNN is configured for detection of a particular subclass, a particular sample of a few thousands within the first object class. The first and second CNNs are stored in the flash memory.

An FPGA control block is operably connected to the flash memory, the image processing module, and is responsible for executing the first CNN, and the second CNN. The FPGA control block is configured to direct the first CNN to determine whether the object is within the first object class with a predetermined degree of certainty. The FPGA control block also directs the second CNN to process the object and determine whether the object is within a subclass of the first object class after the object has been determined to be in the first object class by the first CNN with the predetermined degree of certainty.

The device also includes an onboard transmitter, configured to send a message to a receiver, the message comprising the first CNN's identification of the object's class, pose estimation, coordinates of the object, the second CNN's identification of the object by subclass.

In an alternative embodiment, the predetermined degree of certainty corresponds to a successful determination that the object is within the first object class. Alternatively, the predetermined degree of certainty can correspond to an uncertain determination that the object is within the first object class.

In an embodiment, the FPGA control block comprises a registry for storing rules for determining the predetermined threshold for directing the second CNN to process the object. In another embodiment, the receiver is a storage medium for storing the results of the object determination by the first or second CNN.

The FPGA control block can be further configured to direct the second CNN to process the object when the second CNN has a dataset corresponding to the first object class. The FPGA control block can also be configured to direct the second CNN to process the object despite a reduction in processing speed of the image processing module.

A method is also disclosed for capturing and classifying a digital image of an object. The method includes capturing a plurality of image frames of the object using an image sensor, such as complementary metal oxide semiconductor (CMOS), charge-coupled device (CCD), long-wave infrared (LWIR), or short-wave infrared (SWIR) sensor. These image frames are pre-processed by using an image processing module for filtering, enhancing, or scaling the plurality of image frames. The image frames are then processed using a first convolutional neural network (CNN) to identify a first object class. A determination is made whether the object is within the first object class with a predetermined degree of certainty. When the object is determined to be in the first object class with the predetermined degree of certainty, the object is processed using a second CNN to determine whether the object is within a subclass of the first object class. A message is sent to a receiver with the second CNN's identification of the object by subclass. Alternatively the first CNN's identification can be sent, along with other details about the identification, such as probability of recognition, pose estimation, and coordinates of the object within the image.

Alternative embodiments of the method are similar to alternative embodiments of the device described above. For example, the predetermined degree of certainty can correspond to a successful determination that the object is within the first object class. The predetermined degree of certainty can also correspond to an uncertain determination that the object is within the first object class. The receiver can be a storage medium for storing the results of the object determination by the first or second CNN. The FPGA control block can be further configured to direct the second CNN to process the object when the second CNN has a dataset corresponding to the first object class. In an embodiment, the FPGA control block is further configured to direct the second CNN to process the object despite a reduction in processing speed of the image processing module.

An alternative method is disclosed for capturing and classifying a digital image of an object using an image sensor installed at a first location. A plurality of image frames of the object are captured at the first location using the image sensor. The captured image frames are preprocessed by filtering, enhancing, or scaling using an image processing module at the first location. The image frames are processed using a first convolutional neural network (CNN) to identify a first object class at the first location. A determination is made whether the object is within the first object class with a predetermined degree of certainty at the first location. When the object is determined to be in the first object class with the predetermined degree of certainty, the object is processed using a second CNN to determine whether the object is within a subclass of the first object class. A message is sent to a receiver at a second location, remote from the first location. The message can contain the first CNN's identification of the object class, the second CNN's identification of the object by subclass, probability of recognition, pose estimation, and coordinates of the object within the image. Probability of recognition, pose estimation, and coordinates of the object within the image is identified preferably by the second CNN, as the second CNN is more accurate than the first CNN.

In alternative embodiments, the predetermined degree of certainty corresponds to a successful determination that the object is within the first object class. The predetermined degree of certainty can correspond to an uncertain determination that the object is within the first object class. The uncertain determination that the object is within the first class can result from environmental conditions at the first location. The FPGA control block can be configured to direct the second CNN to process the object when the second CNN has a dataset corresponding to the first object class. The FPGA control block can also be configured to direct the second CNN to process the object despite a reduction in processing speed of the image processing module. The predetermined degree of certainty can be adjusted dynamically based on available system resources.

Figure 1:
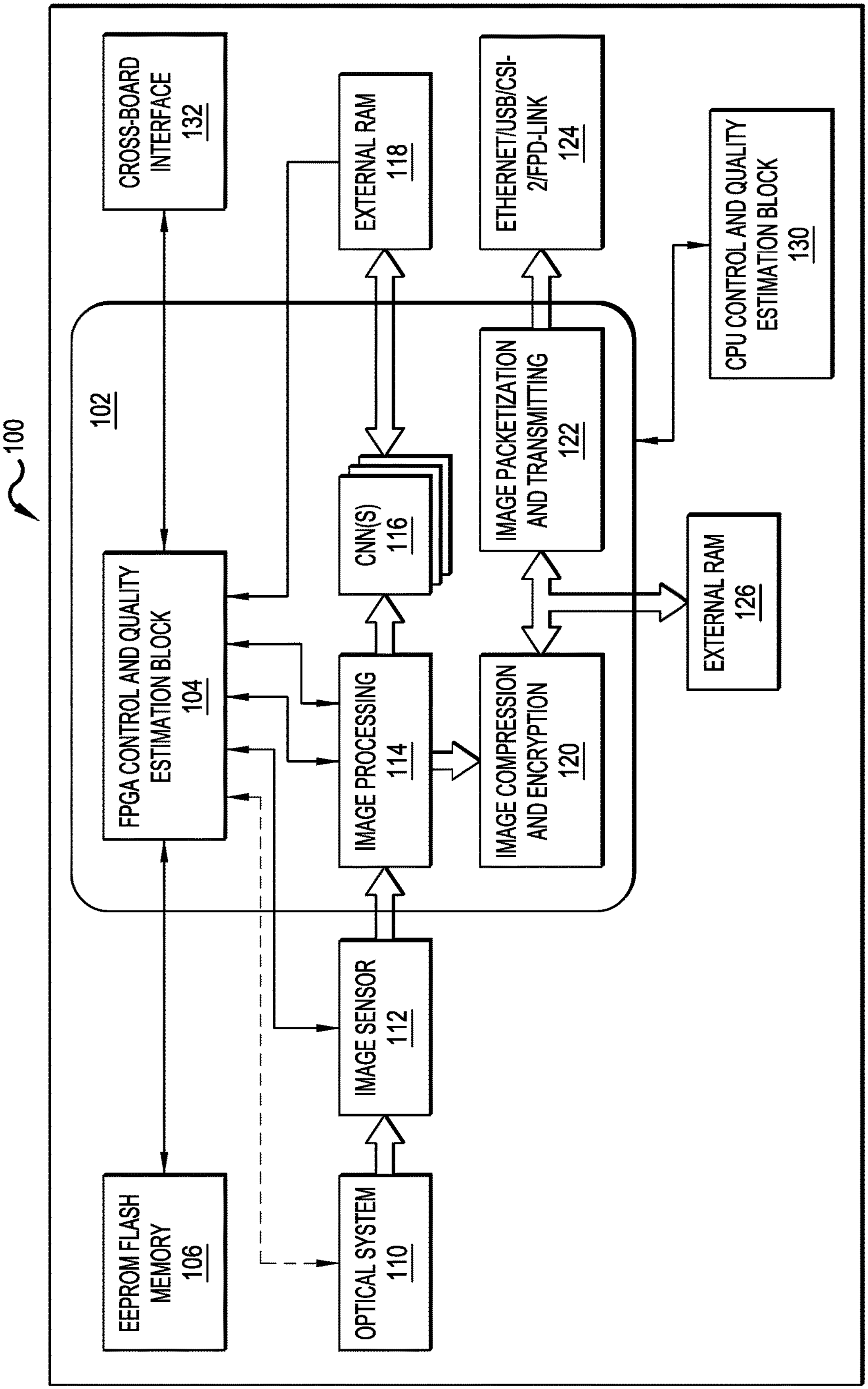
FIG. 1 is a block diagram of an FPGA computer vision device with an onboard CNN according to an embodiment.

The embodiments described are exemplary ways to use the invention to solve technical problems in the field of the invention. The solutions and techniques disclosed can also be used to solve other problems in the field or to solve similar problems in other fields. Substitutions, modifications, and equivalents known to those of skill in the art can be used to implement these solutions and techniques, consistent with scope of the invention described in the claims.

DETAILED DESCRIPTION

Systems and methods for computer vision include onboard convolutional neural network (CNN) models executed by a Field Programmable gate array (FPGA), with the ability to dynamically swap between different CNNs in real-time. Dynamic swapping allows the system to use a specific CNN for identifying an object class and then switch to another CNN to further identify a more detailed subclass within that object class. Dynamic swapping allows the system to efficiently use multiple CNNs stored onboard the FPGA, allowing for precise object detection and identification based on the use case or the purpose of the system. By switching between CNNs based on an initially identified class, the system can optimize its resources and performance. FPGA technology can implement such dynamic CNN swapping, providing efficient processing while reducing power consumption and resource usage, making dynamic swapping particularly suitable for battery-powered and resource-constrained devices such as autonomous vehicles and drones. A modular design of a FPGA computer vision device also allows for continuous updates and improvements to the CNN models without requiring significant hardware changes. This approach enables the device to adapt its object detection, classification and pose estimation capabilities to various scenarios while optimizing resource usage.

The onboard CNNs do not operate simultaneously when processing images. Running multiple CNNs simultaneously requires more system resources than are typically available for neural network configuration onboard a field device. Instead, the FPGA uses CNNs sequentially. Even computationally inexpensive neurons in a CNN generally do not have enough resources to function simultaneously with another CNN.

The sequential use of CNNs, also referred to as CNN swapping, takes place when a first CNN is effective and the class of an object can be detected by that CNN. Device settings can indicate that a second onboard CNN is available and configured for more granular recognition of objects in the object class. The FPGA module loads with its initial firmware, which includes the first CNN. The FPGA control block then directs the FPGA to restart and reconfigure with second firmware including the second CNN. Image frames of the object are already loaded into external RAM (random access memory) and thus these image frames are available for processing with the second CNN. After additional reconnaissance and identification of the object by the second CNN, the device produces its result. Then the device reloads the first CNN and resumes the classification cycle.

The process of CNN swapping comprises various operations. In an embodiment, the computer vision device has an onboard FPGA and multiple CNNs stored in memory, such as flash memory. The stored CNNs have been previously trained to identify objects in various classes.

A coarse object class refers to a broad or general category used to classify objects. A coarse object class represents a high-level grouping, distinguishing between fundamentally different types of objects without delving into their specific details or subtypes. Examples of coarse object classes include “bus,” “sedan,” and “bicycle.” “Bus” is an example of a coarse object class because it includes all kinds of buses, without differentiating between commercial carriers, school buses, private party buses, emergency buses, military buses, and so on. “Sedan” is another example of a coarse object class because it includes automobiles with four doors, without specifying a specific make and model of sedan. Coarse object classes are characterized by their high-level abstraction, focusing on the essential nature of objects and enabling broad categorization and filtering. Coarse object classes offer a less detailed view, sacrificing specificity for a wider scope of applicability.

In contrast to coarse object classes, fine-grained object classes represent more specific and detailed categorizations within a coarse class. Fine-grained object classes focus on distinguishing between subtle variations and subtypes within a broader category. For example, within the coarse class “sedan,” exemplary fine-grained classes are “Toyota Corolla,” “Volkswagen Passat” “Tesla Model 3” and so on, which are further classifications of “kinds” of sedans within the coarse object class “sedan.”

In an embodiment, a default CNN is selected for quick object processing, for example, by processing objects in coarse, high-level classes. Swapping between CNNs happens when the first, default CNN processes captured image frames to determine a coarse object class. Once the first, default CNN has completed its classification, the system checks the other onboard CNNs and determines whether there are any other CNN onboard and configured for further recognition of objects within the coarse object class determined by the first CNN. If no further processing is available then the device sends a message (e.g. immediately). The message is sent to a receiver at a second location, remote from the first location. The message can include classification results and other details. For example, the message can include the coarse object class determined by the first CNN, the probability of object recognition, pose estimation, and coordinates of the object within the image assumed by the first CNN.

The onboard FPGA loads and configures the second CNN to process the captured image frames, which are already stored in external RAM after processing. A second, different CNN is then utilized to perform more detailed analysis and identification of the object within the subclass. After the second CNN completes its analysis and provides the detailed classification results, the system resets. The FPGA is reloaded with the first, default CNN, and the process resumes with the initial classification task. Alternatively, when the second CNN completes its analysis and provides its classification results, the FPGA swaps to another, even more specific onboard CNN. The FPGA can continue the swapping process as long as more specific CNNs are available, or until a predetermined classification threshold is reached. Accordingly, three or more CNNs can be utilized, in increasing levels of specificity.

The process of swapping CNNs includes a determination by the FPGA control block that it is time to swap the CNN model. In an embodiment, a CNN swap will occur when the first CNN has identified the class of object but the particular kind of object has not been recognized. When this condition is met, another onboard CNN that has a dataset for the class of object will be selected as the swap target. Alternatively, a swap occurs when a class of object is recognized but the probability of this recognition is below a predetermined threshold. When this condition is met, the CNN is swapped for another CNN configured to provide a more reliable result without slowing down device performance. In an alternative embodiment, the FPGA control block can also be configured to direct the second CNN to process the object even when the processing speed of the image processing module is reduced by swapping to the second CNN. Such direction by the FPGA control block can be made, for example, when for classifications that concern emergency vehicles or children.

In an embodiment, the results from the first CNN are utilized to optimize the processing performed by the second CNN. Specifically, the first CNN can determine the general coordinates of the detected object within the image. These coordinates are then provided to the second CNN, which uses this positional information to focus its analysis on specific regions of the image. Limiting the second CNN's processing to these areas of interest can significantly reduce the computational load and processing time required for detailed object classification. This targeted approach improves the system's efficiency and the accuracy of fine-grained object identification by reducing the likelihood of irrelevant data influencing the classification outcome.

In an embodiment, the predetermined degree of certainty required for swapping CNNs is adjusted dynamically based on available system resources. For example, when system resources are available, the CNN swapping threshold can be reduced to make the system more likely to swap to a second CNN. When system resources are relatively unavailable, the CNN swapping threshold can be set to make the system less likely to swap to the second CNN. For example, when system resources such as processing power, memory, or bandwidth are fully available, the CNN swapping threshold can be reduced, making the system more likely to swap to a second CNN. Conversely, when system resources are relatively unavailable—such as in cases where processing power is being used for other tasks, memory is constrained due to handling large datasets, or network bandwidth is limited—the threshold can be increased, making the system less likely to swap CNNs. Additional examples of relatively unavailable resources include battery-operated devices, where power-saving modes limit processing capabilities, or scenarios where the system is handling a heavy workload, reducing the resources available for dynamic CNN swapping.

A determination that the object is not clearly within the first class (uncertainty) can result from environmental conditions at the first location. For example, low light conditions, shadows, rain, and fog can contribute to uncertainty in classification.

In an alternative embodiment, certain parameters are considered by the FPGA control module before swapping CNNs. Such parameters can include the type of the object's class, the probability of recognition, or a use-case specific threshold. For example, when an object is in the class "sedan," a swap will be made to determine the kind of sedan. Or a swap will take place when the probability of recognition by the default CNN is less than predetermined threshold, such as below 80% confidence. Alternatively, the swap parameter can be set when the probability is above a minimum threshold. A use-case specific parameter can include specific linkages of object class and probabilities. For example, certain classes of objects are linked to an object-specific probability to trigger a swap while other classes of objects have a different probability required to trigger a swap. For example, the class "car" can be linked to a lower probability to trigger a swap than the class "sedan."

In an embodiment, the value of the required degree of certainty can be the same across multiple CNN configurations. For example, a first CNN can be configured with a given degree of certainty (e.g. 80%). A second CNN can be configured with the same given degree of certainty (e.g. 80%). Any number of CNNs can similarly be configured with the same given degree of certainty (e.g. 80%). In an embodiment, the value of the required degree of certainty can be different for different CNN configurations. For example, a first CNN can be configured with a first degree of certainty (e.g. 50%). A second CNN can be configured with a second degree of certainty different than the first degree of certainty. In an embodiment, the second degree of certainty can be higher (e.g. 75%) or lower (e.g. 45%) than the first degree of certainty. Any number of CNNs can be similarly configured with different degrees of certainty from the first degree of certainty and/or the second degree of certainty.

The processing of images by the FPGA computer vision device starts with image-frame input. Any image-frame format can be used, as long as the image-frame format is compatible with the CNN trained dataset. For example, the image-frames inputted to the image processing module can include raw images, jpeg files, tiff files, png images, or an image format without interaction with previous or next frames. The images can be monochrome or color. Object determination of a class of object, and determination of specific objects in the class, are both based on calculation of the correlation of the captured image frames with a pre-trained pack of images, typically in the form of a dataset. Some CNNs are trained to more effectively distinguish very different objects with a relatively high speed and some CNNs are trained to more effectively identify specific objects from among a large number of similar objects. In any case, however, CNNs are configured to find a correlation with a dataset of images saved in memory.

Registers within the camera define the FPGA camera settings and neural network parameters. These registers govern various settings, including gain, brightness, region of interest, exposure, white balance, sharpness, contrast, lens position, and high dynamic range (HDR) mode. Registers within the camera also control neural network operations, such as rules, setting thresholds for neural network processing, determining whether the entire image should be compressed before being input into the neural network or processed iteratively using defined windows, and whether switching to a second neural network is permitted. The registers are stored in flash memory to guarantee that the camera will resume operation in the exact state in which it was previously functioning in the event of a power interruption.

An exemplary system 100 embodying a FPGA computer vision device is shown in FIG. 1. As described with respect to system 100, various modules can include respective sets of program instructions that adapt the module to implement the particular functionality utilizing the hardware of system 100.

FPGA 102 includes control and quality estimation block 104, which is coupled to EEPROM flash memory 106. Images are captured by optical system 110, which passes the captured images to image sensor 112. Image processing module 114, a subcomponent of FPGA 102, passes the processed images to convolutional neural network (CNN) 116. CNN 116 is coupled to external RAM 118 for image analysis. External RAM 118 generally serves to facilitate CNN classification for images whose large file size requires additional RAM. In an embodiment, blocks refer to fixed, hardware-level building blocks within FPGA 102. Modules refer to flexible structures that can include user-defined collections of logic that utilize the FPGA's resources, including blocks.

In an embodiment, multiple CNNs are stored in flash memory 106. Thus, the particular hardware used for flash memory 106 is selected to have a capacity sufficient for the multiple onboard CNNs. The file size of a CNN and the memory used by its weights varies based on the CNN's attributes. CNNs rely on weights within their convolutional filters to identify specific patterns in image data. These weights are iteratively adjusted during training through backpropagation and optimization algorithms, leading to a reduction in classification error. The final set of weights represents the network's learned understanding of visual features, enabling accurate image classification. Deeper neural networks with more layers tend to have larger file sizes and require more memory for weights. Similarly, layers with more neurons (or filters in the case of convolutional layers) have more weights, increasing file size and memory usage. The size of the input data also plays a role. In an embodiment, weights for a pre-trained CNN, for example in case of YOLO8, require about 3-6 MB of memory. The FPGA structure itself can take up another 10 MB. In such an embodiment, the flash memory required for two CNNs is at least 32 MB.

Processed images are also passed for compression and encryption to image compression and encryption module 120. From image compression and encryption module 120, the compressed images are prepared for transmission by passing the compressed images to image packetization and transmission module 122. Image packetization and transmission module 122 transmits the packetized images to remote locations by way of Ethernet/USB/CSI-2/FPD-Link or another high bandwidth interface available to transmit images at a high rate. Packetization divides large image or video data into smaller packets for efficient network transmission, enabling error correction, congestion control, and parallel processing. Compression reduces data size for storage and bandwidth efficiency, sometimes enabling real-time processing. Packetization and compression can be used, for example, for video surveillance and autonomous vehicles where large visual datasets require fast, reliable handling. Compression can be lossy (higher compression, potential quality loss) or lossless (preserves all data, lower compression).

Other interfaces that support high-bandwidth transmission can be used and ideally will allow the operator to receive the image with similar or faster speeds. 124. Processed images are also passed from image compression and encryption module 120 to external RAM 126. Images can also be loaded from external RAM 126. RAM 126 generally can be used to store results, compressed or encrypted files, and files for transmission.

FPGA 102 is controlled by FPGA control and quality estimation block 104. Probability of detection or recognition is a parameter of an onboard CNN, such as CNN 116. CNN uses a large number of correlation calculations, for example, millions of calculations for every image. The CNN compares a large number of pretrained images, which are known and labeled objects, and the image frames to be processed. If the training process shows a high level of correlation with some class of pre-trained objects in the datasets, the training process increases the probability of recognizing such an object inside the current image. High correlation contributes to increased probability estimation. The probabilities received during some predefined period of time are compared to the thresholds. This comparison allows for the FPGA quality estimation's block to make conclusions about the quality of CNN. In an embodiment, block 104 handles FPGA control and quality estimation. Alternatively, a separate control and quality estimation block 130 is used for estimating quality of CNN classifications and for controlling FPGA 102 operations.

Cross-board interface 132 is used to connect the FPGA control block 104 to external devices. The information shared with external devices can be objects, classes, subclasses, coordinates, probability of recognition, and pose estimation. Cross-board interface 132 can be configured in various ways as a bridge or GPIO (General Purpose Input/Output). GPIO refers to a type of pin on an integrated circuit or electronic circuit board that can be configured by the user to perform different input or output functions. An RS-485 Bridge is a device that allows communication between two or more RS-485 networks. I2C bridges (also known as I2C multiplexers or I2C routers) are devices that allow multiple I2C devices to be connected to a single I2C bus. An SPI bridge is a device that allows communication between two or more Serial Peripheral Interface (SPI) networks or devices. A UART bridge is a device that allows communication between two or more Universal Asynchronous Receiver-Transmitter (UART) networks or devices. Cross-board interface 132, in its various configurations, acts as a translator, enabling data exchange between devices that have different protocols or data formats.

In the realm of CNN-based computer vision, pose estimation involves the precise determination of the spatial location and orientation of key points on objects within images or videos, enabling the understanding of their position and potential movements. CNNs excel at pose estimation, effectively handling variations and occlusions. In the context of traffic monitoring systems, for example, comprehending the pose of vehicles aids in identifying their actions, potentially enabling applications such as automated traffic flow analysis or incident detection. Perceiving the orientation and movements of other vehicles and objects on the road, thereby enhances safety and facilitates informed decision-making for navigation and collision avoidance.

The cross-board interface 132 can be employed by any external system to share data, including meta-information generated from the image classification process. This meta-information can include details such as the number of objects detected, their classes, and subclasses. For instance, in a traffic light control system, the camera can detect a human approaching the traffic light. The system classifies the detected object as a "human" (class) using a coarse object class and further identifies it as a "child" (subclass) using a fine-grained object class. This class and subclass information is then transmitted through the cross-board interface 132 to the traffic light control system. Based on the presence of a child near the traffic light, the system can automatically switch the light from green to red for cars, ensuring safe crossing.

Another example involves automated parking systems, where the camera detects vehicles entering a parking lot. The system identifies the vehicle as a "Sedan" (class) using a coarse object class and can further classify the vehicle as a "Tesla" (subclass) using a fine-grained object class. This meta-information is sent to the parking management system via the cross-board interface 132, enabling the system to guide the electric vehicle to a designated charging station.

In another example, as part of security surveillance, a camera can monitor the entrance to a restricted area. The system can identify an individual as a "person" (class) using a coarse object class and further determine whether the person is an "employee" or an "unauthorized individual" (subclass) using a fine-grained object class. This classification data is shared with the security system through the cross-board interface 132, allowing the system to trigger an alert or lock doors automatically if the individual is unauthorized.

In another practical application, the cross-board interface 132 is utilized in Unmanned Aerial Vehicles (UAVs) for rescue operations and security systems. The UAV can detect an object during a flight and classify it as a "person" (class). After the initial classification, the FPGA control block triggers a CNN swap to refine the identification process. The second CNN then processes the object further and identifies specific characteristics, such as distinguishing the person as an "lying down" or "staying in one place" (subclass). This detailed classification is important for rescue missions, as it enables the UAV to relay precise information through the cross-board interface 132 to ground control or emergency services. The meta-information (results of the class identifications) provided allows rescue teams to prioritize their response and take appropriate action based on the specific needs of the identified individual.

The cross-board interface 132 thus functions as a channel for meta-information, which includes the results of the classification process. Classification information is important for controlling external systems, enabling such external systems to make informed decisions based on the detected objects and their classifications. The cross-board interface 132 facilitates the seamless exchange of this meta-information between the FPGA control block and connected external systems, guaranteeing that the systems respond effectively to real-time data.

Figure 2:
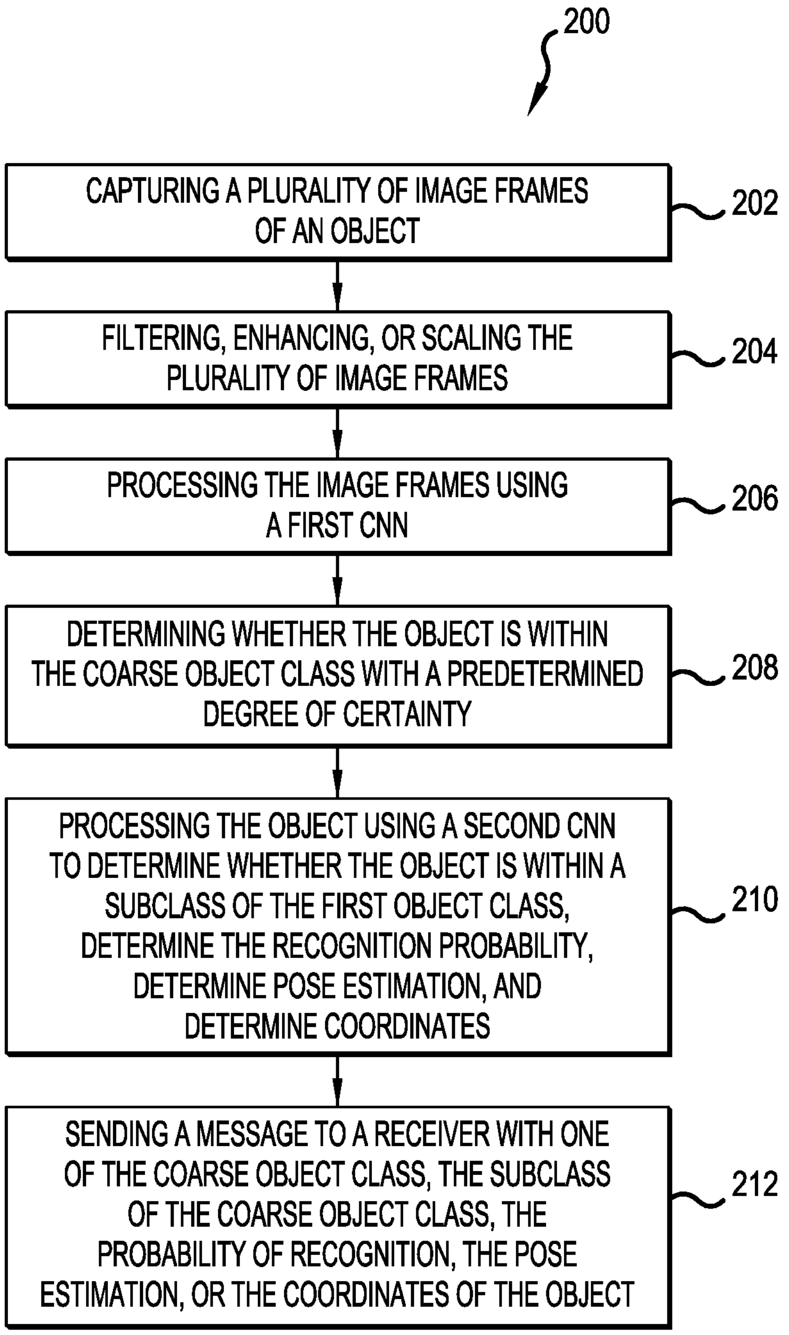
FIG. 2 is a flowchart for a method of capturing and classifying a digital according to an embodiment.

The device of FIG. 1 can be used to perform the operations 200 shown in FIG. 2. At 202, image frames of an object are captured, for example, by a camera. These image frames are filtered, enhanced, or scaled (or any combination of the three) at 204. A first CNN is used to process the image frames at 206. The output of the first CNN is used at 208 to determine whether the object is within a first object class. For example, the first object class can be "cars." Under various conditions, which are described in detail below, a second CNN is used at 210 to determine whether the object is within a subclass of the first object class. For example, a subclass of "buses" can be two doors, three doors, two floors, etc., or make: Mercedes, Toyota, BMW, Tesla, etc. In an embodiment, different CNNs can be used for subclass determination. For example, one fine-grained CNN can be used for door classification. Another fine-grained CNN can be used for floor classification. Yet another fine-grained CNN can be used for vehicle classification. Other determinations can be made, including determining the probability of recognition of the object (e.g. 75%, 80%, 90%, etc.), determining the pose estimation, and determining the object's coordinates in space.

Classification results are transmitted to a receiver at 212. As an example, the classification of the second CNN is "bus with two doors" and this result is then transmitted to another device, such as a device at a remote location. The result can include classification results including the first CNN's classification, the second CNN's classification, or optionally both classifications. The probability of recognition, pose estimation, and object coordinates can also be included in the transmitted message.

Figure 3:
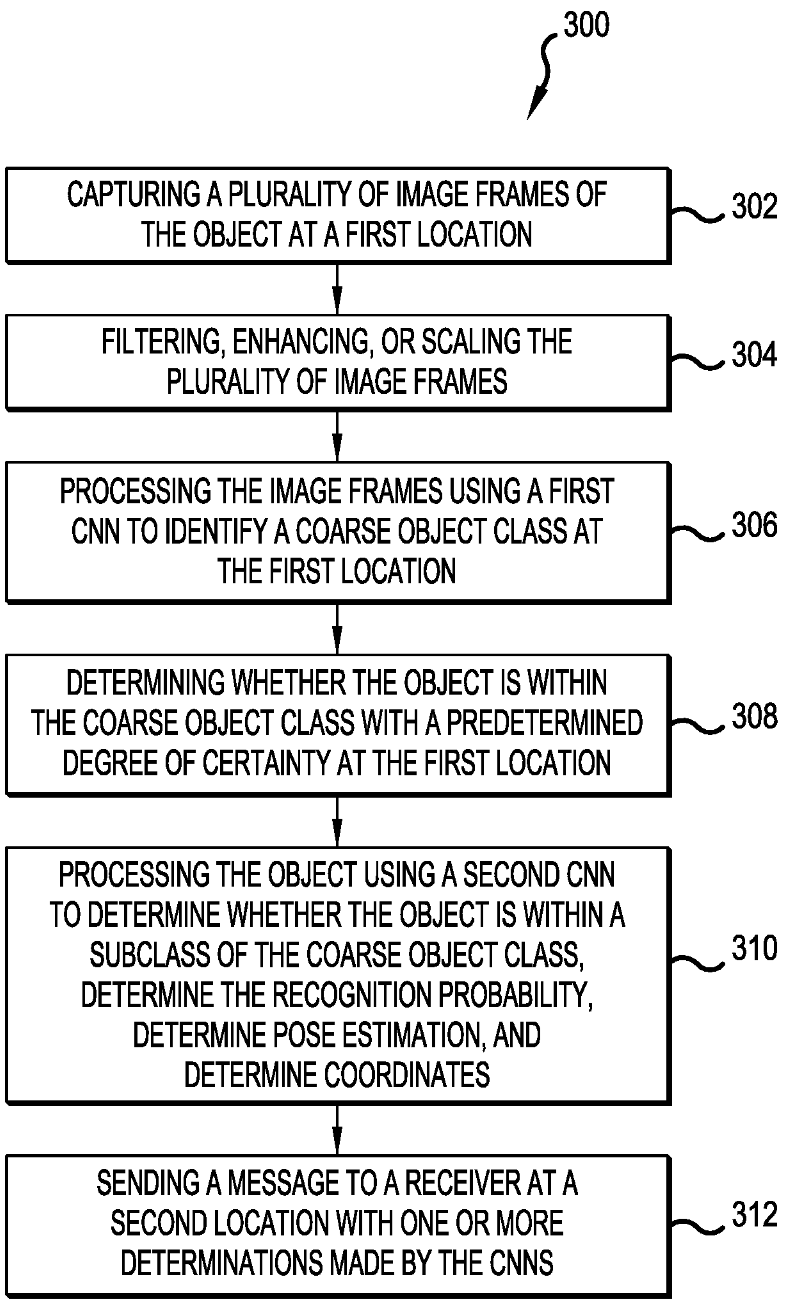
FIG. 3 is a flowchart for an alternative method of capturing and classifying a digital in accordance with an embodiment.

An alternative series of operations 300 is shown in FIG. 3. These operations describe an embodiment where events at the first location can be monitored at a remote location. In FIG. 3, image frames of an object are captured at the first location at 302. This first location can be, for example, the location where a device (or portions of the device) such as the device of FIG. 1 is installed. In an exemplary embodiment, the device is installed at a location adjacent to a roadway with an angle for observing traffic. Alternatively, the device comprises a security camera installed with a view of an entrance to a building of interest.

As with the image frames of FIG. 2, the image frames captured at 302 are filtered, enhanced, or scaled (or any combination of the three) at 304. A first CNN is also used to process the image frames at 306. The output of the first CNN at 308 determines whether the object is within a first object class. For example, the first object class can be "sedan." A second CNN can be used at 310 to determine whether the object is within a subclass of the first object class. For example, a subclass of "sedan" can be "Toyota Corolla" or "Volkswagen Passat."

Other determinations can be made, as described in connection with FIG. 2. These determinations include determining the probability of recognition of the object, determining the pose estimation, and determining the object's coordinates in space.

Classification results are transmitted to a receiver at 312. As an example, the classification of the second CNN is "Toyota Corolla" and this result is then transmitted to another device at a remote location. Classification results can include the determinations made by the CNNs, such as the first CNN's classification, the second CNN's classification, or optionally both classifications. The probability of recognition, pose estimation, and object coordinates can also be included in the transmitted message. In alternative embodiments, different combinations of these determinations can be included in the classification results, depending on particular use cases or objects of interest.

In an embodiment, YOLO, or a similar computer vision model designed for real-time object detection, is used for image detection. An example of a suitable model for fast recognition of different object types is the YOLO (You Only Look Once) object detection model family. Models such as YOLO can identify and localize objects in images and videos, detecting a wide range of objects from common items like cars and people. Such models are optimized for speed, allowing them to detect objects in real-time with minimal latency. These fast object-detection models can also classify objects into specific categories, providing additional information about the detected objects. The fast object-detection model can also output masks that segment the detected objects, providing more detailed information about their shape and location.

For fast recognition of different types of objects, a network (the first CNN) starts by taking an image as input and parsing the image into a grid of cells. The backbone of the CNN starts searching for correlations between pre-trained images and the input image at a different scale allowing the CNN to recognize objects regardless of their size within the image. In this context, scale refers to the size of the entire object within the image. For example, the CNN can recognize a wheel at various scales, independent of whether the wheel is part of a car or another context. Multiple scales help the CNN to reliably identify objects even when they appear at different sizes within the visual scene.

Next, a neck network prepares scaling results for a detection head. The detection head uses found correlations to generate predictions for each grid cell, including coordinates of the object (bounding box coordinates), class probabilities, and objectness scores. Finally, Non-Maximum Suppression (NMS) is employed to filter out redundant predictions, keeping only the most confident and accurate ones. The end result is a set of detected objects, class label, probability of recognition and as option coordinates of the object (bounding box coordinates), pose estimation.

A FPGA computer vision model, as described above, uses Convolutional Neural Networks (CNNs) as the foundational elements of its architecture. The backbone network, which can be based on architectures such as CSPDarknet53, constitutes a deep CNN responsible for searching correlation between the input image and pre-trained images. The backbone network comprises multiple convolutional layers, mixed with operations like pooling and normalization. This approach allows the model to efficiently correlate visual patterns at different scales, allowing object recognition based on overall size and context.

A neck network, also composed of convolutional layers, prepares scaling results for a detection head. The neck network aggregates information from diverse sizes of image, furnishing a comprehensive representation for object detection across different scales.

A detection head employs convolutional layers to process all the correlations that have been found earlier and generate predictions for each grid cell within the image. Convolutional layers are trained to identify objectness, classify objects by finding the most significant correlation with pretrained images, and accurately regress the coordinates of the object (bounding box coordinates). Objectness, in object-detection models, such as YOLO, helps distinguish meaningful object proposals from the vast number of potential regions in an image. By assigning an objectness score to each region, the model can prioritize regions with higher objectness for further processing and discard regions with low objectness, thereby improving both efficiency and accuracy.

An exemplary model, such as YOLO, employs residual connections (or skip connections) within its backbone network. These connections allow the network to learn residual mappings (the difference between the input and output of a layer) which can help with training deeper networks and improve gradient flow.

In an embodiment, one of the onboard CNNs uses a Residual Network (ResNet) architecture with, for example, 34 parameter layers, configured for image recognition tasks. For example, the ResNet CNN can be the secondary CNN for classifying objects in a class. For example, a secondary classification task can be to identify cars that have broken mirrors from a more general class of cars. In ResNet CNN architecture, shortcut connections are added to pairs of 3×3 convolutional filters, which transform the network into its residual version. Identity shortcuts can be applied directly when input and output have the same dimensions. When the dimensions increase, zero-padding can be used for increasing dimensions without introducing extra parameters or projection shortcuts can be used to match dimensions through 1×1 convolutions.

A primary characteristic of this ResNet architecture is the use of residual learning, where the stacked layers are explicitly configured to fit a residual mapping. This approach addresses the degradation problem commonly encountered in deep neural networks, where accuracy saturates and then degrades rapidly as depth increases. By reformulating the layers as learning residual functions with reference to the layer inputs, the network becomes easier to optimize and can achieve accuracy gains from increased depth. For example, the 34-layer residual image network is used because of its superior performance compared to plain networks with the same number of layers.

The invention claimed is:

1. A device for capturing and classifying a digital image of an object, the device comprising:

a flash memory;

an image sensor configured for capturing a plurality of image frames of the object;

an image processing module configured to receive the plurality of image frames from the image sensor and to filter, enhance, or scale the plurality image frames;

a first convolutional neural network (CNN) configured for processing the image frames and identifying a coarse object class;

a second CNN configured for detection of a particular subclass, wherein the first and second CNNs are stored in the flash memory;

an FPGA control block, operably connected to the flash memory, the image processing module, and is responsible for executing the first CNN, and the second CNN, the FPGA control block configured to:

direct the first CNN to determine whether the object is within the coarse object class with a predetermined degree of certainty, and direct the second CNN to process the object and determine whether the object is within a subclass of the coarse object class when the object is determined to be in the coarse object class by the first CNN with the predetermined degree of certainty; and a transmitter, configured to send a message to a receiver, the message comprising results of the object class determination of the first CNN or the object subclass definition of the second CNN.

2. The device of claim 1, wherein the predetermined degree of certainty corresponds to a successful determination that the object is within the coarse object class.

3. The device of claim 1, wherein the predetermined degree of certainty corresponds to an uncertain determination that the object is within the coarse object class.

4. The device of claim 1, wherein the FPGA control block comprises a register for storing rules for determining the predetermined threshold for directing the second CNN to process image frames of the object.

5. The device of claim 1, wherein the FPGA control block comprises a register for storing rules identifying the coarse object classes whose objects the second CNN is permitted to process.

6. The device of claim 2, wherein the FPGA control block is further configured to direct the second CNN to process the object when the second CNN has a dataset corresponding to a subclass of the coarse object class.

7. The device of claim 3, wherein the FPGA control block is further configured to direct the second CNN to process the object despite a reduction in processing speed of the image processing module.

8. A method of capturing and classifying a digital image of an object, the method comprising:

capturing a plurality of image frames of the object using an image sensor:

filtering, enhancing, or scaling the plurality of image frames using an image processing module;

processing the image frames using a first convolutional neural network (CNN) under the control of a Field-Programmable gate array (FPGA) control block to identify a coarse object class, determine a probability of recognition of the object, pose estimation, and determine coordinates of the object;

determining whether the object is within the coarse object class with a predetermined degree of certainty;

when the object is determined to be in the coarse object class with the predetermined degree of certainty, processing the object using a second CNN under the control of the FPGA control block to determine whether the object is within a subclass of the coarse object class, determine a probability of recognition of the object, pose estimation, and determine coordinates of the object; and sending a message to a receiver, the message comprising at least one of the coarse object class, the subclass of the coarse object class determined by CNNs, the probability of recognition of the object, the pose estimation, and the coordinates of the object within the image assumed by the CNNs.

9. The method of claim 8, wherein the predetermined degree of certainty corresponds to a successful determination that the object is within the coarse object class.

10. The method of claim 8, wherein the predetermined degree of certainty corresponds to an uncertain determination that the object is within the coarse object class.

11. The method of claim 8, wherein the FPGA control block comprises a register for storing rules identifying the coarse object classes whose objects the second CNN is permitted to process.

12. The method of claim 8, wherein the FPGA control block is further configured to direct the second CNN to process the object when the second CNN has a dataset corresponding to a subset of the coarse object class.

13. The method of claim 8, wherein the FPGA control block is further configured to direct the second CNN to process the object despite a reduction in processing speed of the image processing module.

14. A method of capturing and classifying a digital image of an object using image frames captured by an image sensor installed at a first location, the method comprising:

capturing a plurality of image frames of the object at the first location using the image sensor;

filtering, enhancing, or scaling the plurality of image frames using an image processing module at the first location;

processing the image frames using a first convolutional neural network (CNN) to identify a coarse object class at the first location;

determining whether the object is within the coarse object class with a predetermined degree of certainty at the first location;

when the object is determined to be in the coarse object class with the predetermined degree of certainty, processing the object using a second CNN to determine whether the object is within a subclass of the coarse object class, determine a probability of recognition of the object, determine pose estimation, and determine coordinates of the object; and sending a message with one or more of the determinations made by the CNNs to a receiver at a second location, remote from the first location.

15. The method of claim 14, wherein the message comprises at least one of the subclass of the coarse object class determined by the second CNN, the probability of recognition, the pose estimation and the coordinates of the object within the image determined by the second CNN.

16. The method of claim 14, wherein the predetermined degree of certainty corresponds to a successful determination that the object is within the coarse object class.

17. The method of claim 16, wherein the uncertain determination that the object is within the coarse object class results from environmental conditions at the first location.

18. The method of claim 14, wherein the FPGA control block is further configured to direct the second CNN to process the object when the second CNN has a dataset corresponding to a subset of the coarse object class.

19. The method of claim 14, wherein the FPGA control block is further configured to direct the second CNN to process the object despite a reduction in processing speed of the image processing module.

20. The method of claim 14, wherein the predetermined degree of certainty is adjusted dynamically based on available system resources.

* * * * *